June 23, 1936.  L. D. FERRELL  2,044,938

VALVE RESEATING TOOL

Filed April 4, 1934

INVENTOR.
Lewis D. Ferrell
BY
Ray, Oberlin & Ray
ATTORNEYS.

Patented June 23, 1936

2,044,938

UNITED STATES PATENT OFFICE 2,044,938

VALVE RESEATING TOOL

Lewis D. Ferrell, Cleveland, Ohio

Application April 4, 1934, Serial No. 718,968

2 Claims. (Cl. 90—12.5)

The present invention relates to a tool for recutting, refinishing and reseating valves, and more particularly the seats of valves for water faucets and the like.

One of the objects of my invention is to provide means for conveniently locking the cutting tool spindle against longitudinal or feeding movement, while at the same time providing means for conveniently feeding such spindle intermittently at the will of the operator. Incorporated with such releasable locking means, there is further means for eliminating uneven or chattering action of the cutting tool. Still another object of the invention is to provide a valve seat cutting tool which is so constructed as to produce a self-aligning action. A further object is to provide a novel and efficient means for locking a thread cutting tap to the end of the tool stem or spindle. Additional objects and advantages shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
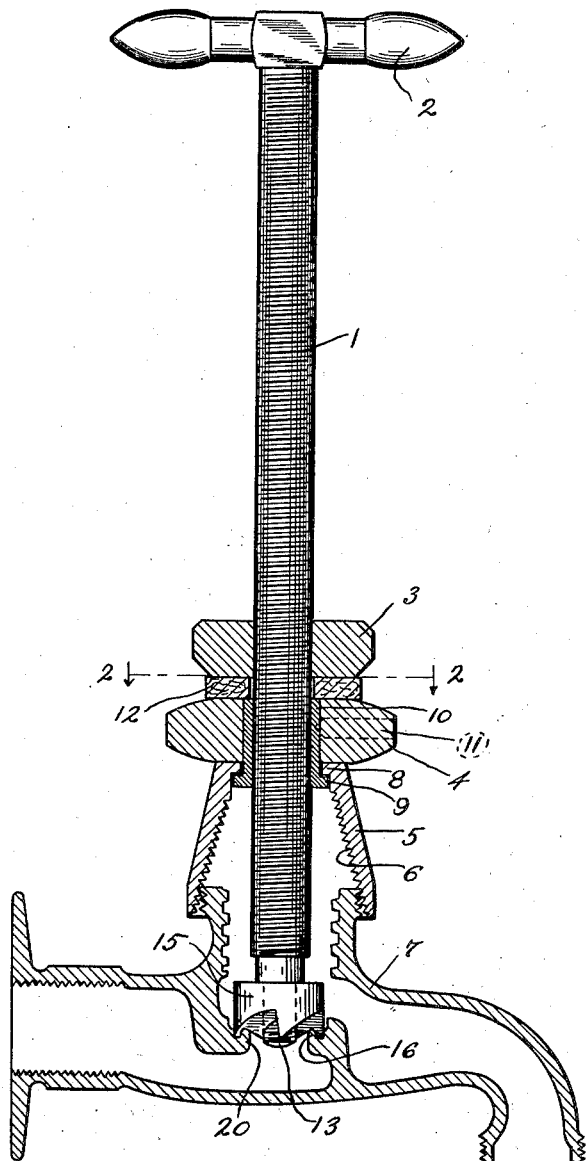
Figure 2:
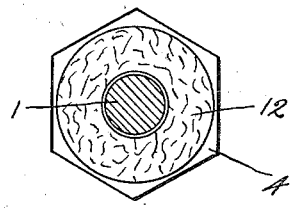
Figure 3:
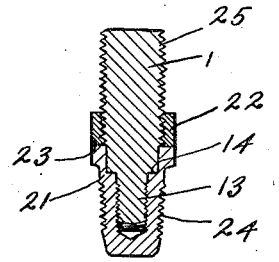
Figure 4:
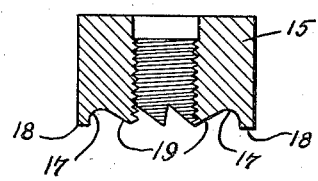

In said annexed drawing:

Fig. 1 is a sectional elevation showing the valve reseating tool constructed according to the principle of my invention in position upon a faucet; Fig. 2 is a section taken substantially along line 2—2 of Fig. 1 in the direction of the arrows; Fig. 3 is an enlarged sectional view illustrating the manner of attachment of the thread cutting tap; Fig. 4 is an enlarged sectional view of the valve seat cutter.

Now referring more particularly to the drawing, the device illustrated therein consists of a main stem or spindle 1 which is threaded throughout the majority of its length. An operating handle 2 is mounted on the upper end of the spindle 1. A pair of nuts 3 and 4 threadably engage with the spindle 1. A cone-shaped adapter 5 which is interiorly threaded as at 6 serves as means for removably attaching the cutting tool to the faucet or valve casing 7. The adapter 5 is rotatably attached to the nut 4 by means of the interlocking shoulders 8 and 9. In order to assemble the nut 4 and the adapter 5, the nut 4 may be constructed of two pieces consisting of a central sleeve portion 10, and an external portion which is secured thereto by means of a dowel pin 11. A compressible washer 12 is positioned between the nuts 3 and 4. The washer 12 may be composed of any suitable flexible or compressible material such as leather, fiber, or rubber. The lower end of the spindle 1 is in the form of a threaded portion 13 which is of less diameter than that of the body portion of the spindle. As shown in Fig. 3, a shoulder 14 is positioned just above the threaded portion 13. A cutting tool 15, which is interiorly threaded is then adapted to be secured to the lower end of the spindle.

In operation, the tool is attached to the faucet 7 as shown in Fig. 1. The spindle 1 is then screwed down until the cutting edges of the cutting tool 15 contact with the face of the valve seat 16. The nut 3 is then tightened down against the nut 4 whereby these latter two elements act as a friction lock preventing the spindle from further feeding toward the valve seat 16. The compressible washer 12 serves the double function of not only effecting a means for varying the amount of frictional engagement with which the nuts 3 and 4 will be locked to the shaft, but also as a cushioning means which will tend to eliminate any grabbing or chattering action transmitted from the cutter 15 in the event that too deep a cut is being taken. After the initial cut is made, the operator merely grasps the nuts 3 and 4 between his thumb and forefinger and rotates the operating handle 2. In this manner, the spindle 1 is further fed or moved back to or from the valve seat 16. The cutting edges of the cutting tool 15 have the concave portions 17 which are for the purpose of cutting a bead or rounded edge on the valve seat 16. The lips 18 of the cutting edge of the tool 15 define a sharp shoulder on the outer periphery of the valve seat 16. Between the concave portions 17 of the cutting edge of the tool 15 and the inner ends of the cutting edges, there are the angularly inclined portions 19. These latter portions 19 serve as means for properly aligning the cutting tool 15, inasmuch as they generate a conical surface extending from the center of the axis of the spindle 1 and the cutting tool 15. This latter self-aligning feature is of particular importance when it is considered that the majority of faucet casings are castings and that therefore the valve passage 20 therein is usually of an irregular contour. The angularly inclined portions 19 of the cutting edge of the tool 15 will therefore remove such irregularities as the reseating cut is made and will serve as a means for properly guiding and aligning the spindle 1 and cutter 15 during the valve seating, finishing or recutting operation.

At times it is desirable to tap an interior thread through the valve opening 20, for the reception of a new valve seat insert. For this purpose, I have provided a thread cutting tap 21 which threadedly engages with the threaded portion 13 on the end of the tool spindle 1. A complementary shoulder is formed on the interior of the tap 21 which is adapted to abut against the shoulder 14 on the spindle 1. A lock nut or collar 22 is threadably engaged with the main body portion of the spindle 1 and adapted to screw down against the upper end 23 of the tap 21.

Due to the fact that the pitch of the threads of the body portion of the spindle 1 is different from the pitch of the threads of the smaller or end portion 13, the lock nut 22 may be tightened down against the tap 21 and thereby effect a satisfactory locking action.

It should also be noted that the pitch of the threads 24 of the tap 21 is equal to the pitch of the threads 25 of the spindle 1. In this manner, when the thread cutting operation is performed, and the operator holds nut 4 against rotation, the tap 21 will be fed at a rate equal to the cutting rate. Or in other words, a positive feed will be provided for the thread cutting tap, and the possibility of an improper or a damaged thread cut is thereby eliminated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a valve reseating tool, the combination of a threaded spindle, a pair of members threadably engaging said spindle, one of said members rotatably carrying a threaded means adapted for attachment to the valve casing, and a resilient element positioned between said pair of members, whereby the frictional engagement of said members with said spindle may be adjustably varied.

2. In a valve reseating tool, the combination of a threaded spindle, a pair of nuts threadably engaging said spindle, one of said nuts rotatably carrying a threaded means adapted for attachment to the valve casing, and a washer composed of compressible material positioned between said pair of nuts, whereby the frictional engagement of said nuts with said spindle may be adjustably varied.

LEWIS D. FERRELL.